Dec. 3, 1935. L. H. DAWSEY 2,022,650
HYDROGEN PEROXIDE PROCESS
Filed June 11, 1931 2 Sheets-Sheet 1

Dec. 3, 1935.  L. H. DAWSEY  2,022,650
HYDROGEN PEROXIDE PROCESS
Filed June 11, 1931  2 Sheets-Sheet 2
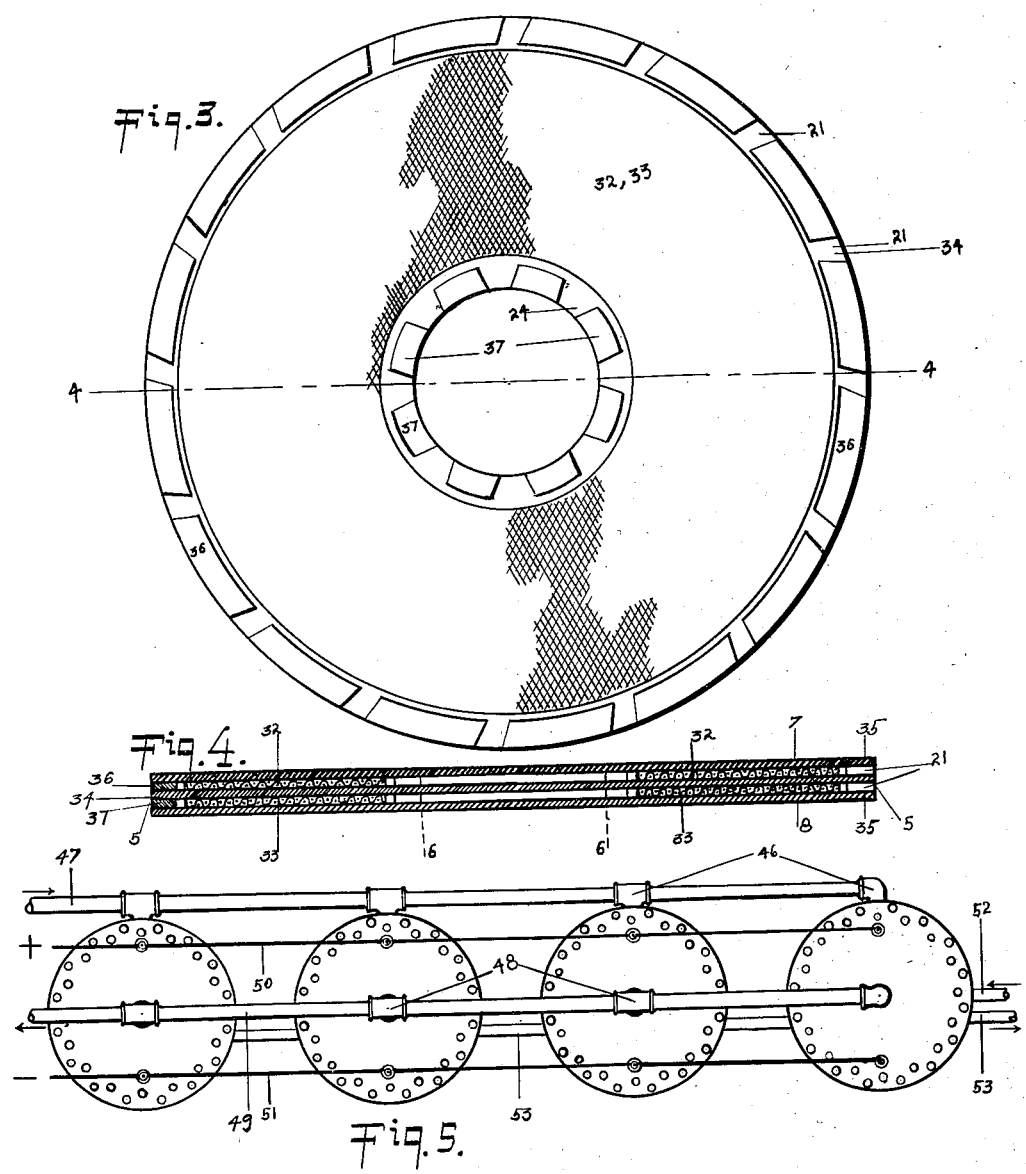
Inventor
Lynn H. Dawsey
By Elwin F. Samuels
Attorney Patented Dec. 3, 1935

2,022,650

UNITED STATES PATENT OFFICE 2,022,650

HYDROGEN PEROXIDE PROCESS

Lynn H. Dawsey, New Orleans, La.

Application June 11, 1931, Serial No. 543,703

12 Claims. (Cl. 204—31)

This application is a continuation in part of my application No. 395,502, filed September 27, 1929.

The invention relates to the production of hydrogen peroxide by a direct synthetical process from the elements hydrogen and oxygen.

According to the improved process, hydrogen peroxide is produced by causing hydrogen gas in the presence of and mixed with small amounts of oxygen to become activated in the corona, brush, or silent electric discharge, the primary step in causing the combination of the two elements being the production of hydrogen in its dissociated or atomic state, followed by secondary reactions in which the dissociated hydrogen reduces oxygen to hydrogen peroxide.

The process may be carried out at ordinary room temperature or thereabouts, the temperature of the reacting gases ranging from 15 to 25° C. at the time of admission into the discharge chamber. The gas mixture is caused in a convenient manner to pass into and out of the discharge at a fast rate, the object being to minimize the thermal decomposition of the hydrogen peroxide and to reduce the dissociation effect due to ions and electrons during the activation of the gas mixture within the discharge. The most favorable pressure of the gas mixture is atmospheric pressure or thereabouts as this best facilitates the combination; however, this condition may be subjected to some variation without notable loss of efficiency as in the case where the gases are pulled through the discharge apparatus by suction or as in the case where the gases are forced through the apparatus by application of pressure. The highest concentration of oxygen in the hydrogen oxygen mixture which will not ignite at atmospheric pressure in the silent electric discharge is eight per cent. This figure, though slightly variable, is regarded as the limiting concentration of oxygen which can be used without danger from explosions. All concentrations of oxygen below this figure may be used to advantage and with safety. The proportions of oxygen may be considerably reduced as held in the claims which follow, and a mixture containing two per cent oxygen and ninety-eight per cent hydrogen has been found satisfactory in the production of hydrogen peroxide when subjected to the conditions outlined above. The silent electric discharge is with advantage produced by using high frequency power of 500 to 3,000 cycles per second. Ozone is produced as a by-product, the amount of ozone formed being proportional to the concentration of oxygen per cent in the initial gas mixture. It should also be noted that water is formed, partially from the thermal decomposition of the hydrogen peroxide, partially from the direct combination of hydrogen and oxygen, and partially from the dissociation of hydrogen peroxide due to ionic and electronic collisions in the discharge. The formation of water is objectionable. This effect is minimized by employing a water-jacketed apparatus which prevents the temperature of the gases while in the discharge or at any time thereafter, from rising above 70° C.

As an example of the practice of the process of the invention, a mixture initially of ninety-four per cent hydrogen and six per cent oxygen has been caused to flow at a rate of 40 centimeters per second across the face of a mica dielectric plate which was interposed between two wire gauze electrodes spaced closely together and at an initial temperature of 15° to 25° C. with a discharge taking place between the electrodes, and the gas mixture circulating about both the inner and the outer surfaces of, and in intimate contact with both electrodes. Hydrogen peroxide vapor, water vapor and ozone were formed and subsequently swept from the discharge zone or activating space by the cooler incoming gases, the outgoing gases leaving the discharge consisting of hydrogen and oxygen in high concentrations, together with hydrogen peroxide, water vapor and ozone, which were present in low concentration and were in a highly diluted state. The condensable hydrogen peroxide and water vapor were then removed from the gas stream by suitable means as bubbling through distilled water. The gases were made to circulate continuously through the discharge chamber while pressure was maintained approximately constant by alternate additions of more oxygen and hydrogen. The hydrogen peroxide was of concentration greater than thirty per cent and as high as seventy per cent depending upon the rate of flow of the gases and upon the method of condensing the liquifiable products. To the electrodes of the apparatus, kept at a potential difference of 4000 volts, was connected a source of alternating current giving a frequency of 1000 cycles per second. The rate of electrical energy consumption was 60 to 70 kwh. per kilogram of one hundred per cent hydrogen peroxide by weight, while 2 to 3 per cent by volume of the gases passing through the apparatus were converted into hydrogen peroxide exclusive of the volume converted into water and ozone.

In the accompanying drawings I have illustrated an apparatus by means of which the process of my invention may be practiced. The hydrogen peroxide generators, to be hereinafter described, belong to the general type wherein each electrode consists of a metallic sheet in the form of wire gauze and a pair of electrodes having opposite polarities extending in parallel planes and are separated by a sheet of dielectric material (mica for example) while the stream of hydrogen and oxygen is caused to pass over the electrodes, where a series of pairs may be employed to act upon the gas stream simultaneously and in parallel. In the known arrangement, a pair of electrodes of opposite polarities, with an interposed dielectric sheet, together constitute a separate electrode assemblage, the assemblages being spaced apart and the stream of gas being so confined as to follow a zig-zag path between the opposed surfaces of the electrodes and dielectric sheets which constitute an assemblage.

It is to be observed that the efficiency (yield per kwh.) of the hydrogen peroxide generators is dependent upon the degree of intimacy of contact between the electrodes and the gas mixture which is passed thereover during the reduction of oxygen in the discharge; however, the closer the intimacy of contact between the electrodes and the gas, the greater is the necessity for passing the gas as rapidly as possible over the electrodes in order to prevent excessive rise in temperature (above about 70° C.) with consequent disintegration of hydrogen peroxide produced. The present invention has for one of its objects to additionally provide an improved hydrogen peroxide generator of the general type referred to below, so constructed as to permit greater production of hydrogen peroxide, relatively to the power consumed or the quantity of hydrogen and oxygen passed through the apparatus, being obtained than constructions hitherto in use.

According to the invention adjacent pairs of electrodes are so assembled that they extend in close superficial proximity to one another, a dielectric sheet being interposed between adjacent electrodes of opposite polarities, while a pair is housed within a separate closed space adapted to cause the gas to be fed into the assemblage and, in its passage thereover, to be confined to the interspaces of or between each electrode and the adjacent dielectric sheet, with the result that both intimacy of contact between the gas and the electrodes and also rapidity of flow of the gas relative to the quantity passed through the apparatus in a given time are secured. Such an arrangement enables advantageous results to be secured as compared with those obtainable with constructions previously proposed according to which hydrogen and oxygen are fed in between concentric glass cylinders serving as dielectrics both being interposed between electrodes situated away from and not in intimate contact with the gas mixture.

In the invention cooling is accomplished, in addition to the removal of heat afforded by passage of a continuously fresh supply of gas through the several discharge spaces of the apparatus, by circulation of water, the circulation of water being so directed as to make contact with the walls which confine the electrode assemblages to the discharge chambers, so that heat generated therein is conducted off.

In the drawings illustrating the apparatus,

Figure 3 is a top view, drawn to a larger scale, of a circular sheet of wire gauze constituting an electrode superimposed upon an adjacent electrode.

Figure 4 is a vertical section of an assemblage or pair of electrodes with their interposed dielectric sheet, taken as on line 4—4 of Figure 3.

Figure 5 is a plan view, drawn to smaller scale, showing a series of generators similar to those in Figures 1 and 2 mounted side by side all supplied in parallel with hydrogen oxygen gas mixture and also with electric current.

Figure 1:
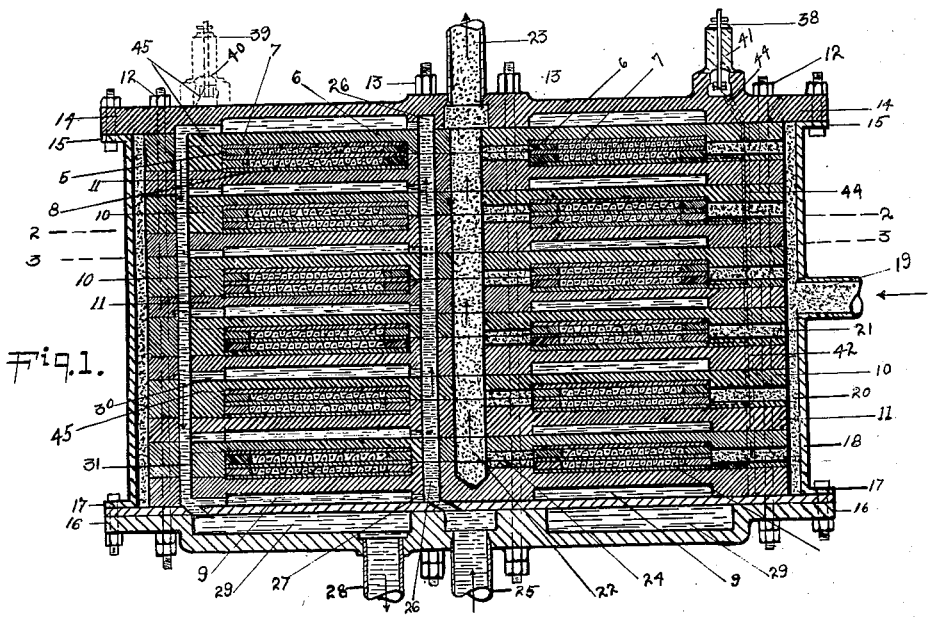
Figure 1 represents a generator in two vertical half-sections, the section on the right hand side of the center line showing the gas circulation throughout the generator, and the section on the left hand side of the center line showing the water circulation throughout the generator.

Referring first to Figures 1 to 4, the various pairs of electrodes or electrode assemblages constituting a generator are housed within separate annular spaces of rectangular cross-section having outside wall circumferences 5, inner wall circumferences 6, tops 7, and bottoms 8, several assemblages being placed in pancake fashion one above the other, but having between alternately spaced electrode assemblages annular water spaces 9 which are also of rectangular cross-section and of dimensions similar to the spaces occupied by the electrode assemblages. The major part of the generator including the walls 5, 6, 7, 8 and the walls bounding the water spaces 9 which divide the water spaces from the various electrode chambers, are constructed of an insulating material (preferably of slate) the different spaces being cut into the separator plates 10, 11 which are mutually held together by the common bolts 12, 13 running vertically through the outer edges and also near the center of the generator.

The removable cover 14 made of an insulating material which is bolted to the metal flange 15, constitutes the upper member of the series of separator plates 10, 11, whereof the lower member, constituted by a metal disc plate 16 (preferably of aluminum or galvanized iron) is rigidly bolted to the metal flange 17 while the several separator plates are pressed together between the upper and lower members by the vertical bolts 12, 13 and are held together by the cylindrical metal gas jacket 18.

The metal pipe 19 (Figures 1 and 2) serves as the gas inlet to the apparatus, for which purpose it is provided, and is adapted to be coupled in any convenient manner to a pipe leading from a source of hydrogen oxygen gas-supply, being located on the right-hand side of the gas jacket 18 and opening out into the cylindrical gas space 20 which completely surrounds the contents of the generator on all sides, affording an ample supply of gas at the several outside opening slots 21 which are cut obliquely but horizontally in the disc members 10. The direction of inlet gas flow is indicated by arrows. Similarly a hole 22 drilled vertically through the disc-shaped separator plates 10, 11 at the center of the generator and also a metal pipe 23 (preferably coated internally with vitrified enamel) constituting the upper projection of hole 22, serve as the gas outlet of the apparatus, whereof the center passage 22 having slots 24 emptying therein and channeled radially in the separator plates 10, 11, is adapted to collect the gases, from the discharge, evenly from the whole depth of the generator, as indicated. The gas may be forced or drawn through the apparatus by suitable means as usually employed in different types of ozone generators.

Figure 2:
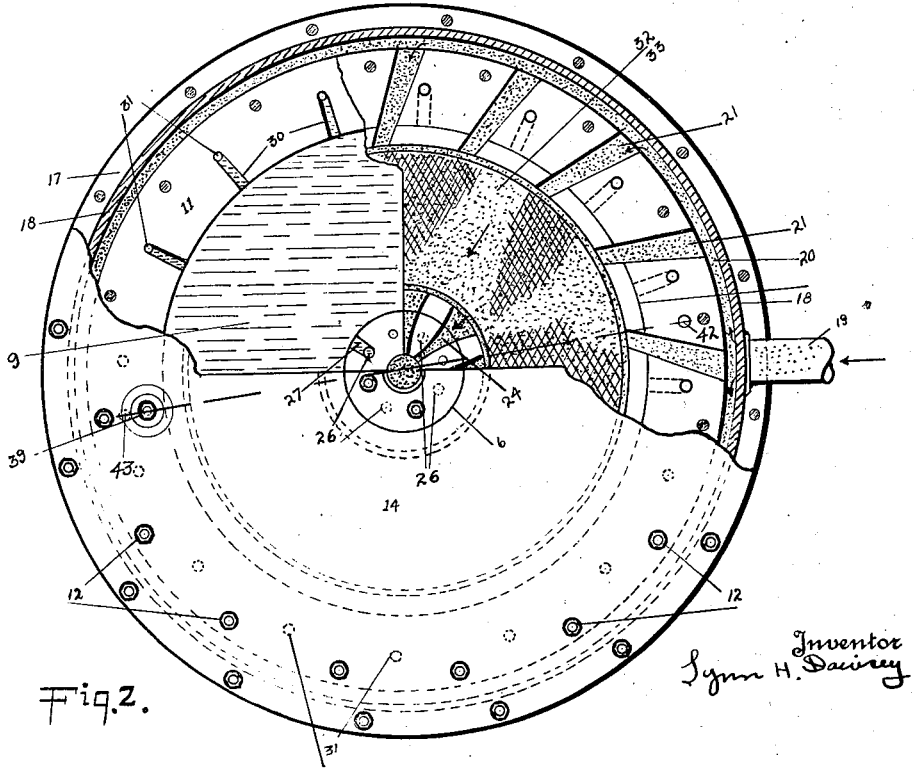
Figure 2 is a top view partly in two sections, the upper righthand section and the upper lefthand section taken respectively on lines 2—2 and 3—3 of Figure 1.

Referring to the left hand halves of Figures 1 and 2, water circulation throughout the apparatus is provided for. The metal center pipe 25 serves as the water inlet passage, for which it is provided below, threaded into the lower metal base disc 16, adapted to be connected in any convenient manner to a pipe leading from a source of water supply, while above the metal base 16 the center passage 25 branches out into four independent passages 26 drilled vertically through the separator plates 10, 11 near the center of the generator. The water passages 26 have a series of slots 27 opening therefrom, at each level, into the water spaces 9 adapted to distribute water uniformly from the depth of the generator, radially into the water spaces 9, the flow being directed as indicated and in counterdirection to the radial flow of gases in the discharge spaces 5, 6, 7, 8 which are located directly above and below each water space. Similarly the metal pipe 28 serves as the water discharge passage for which purpose it is provided below, threaded into the lower base plate 16, adapted to be coupled in any convenient manner to a pipe leading to the desired destination, and above plate 16 opening out into a collecting space 29. The flow of water is directed, as indicated radially outward from the water spaces 9, by way of slots 30 which are cut in the separator plates 11, into holes 31 drilled vertically in the separator plates 10, 11 near the outer edge of the generator, and is collected uniformly from the whole height of the generator in the space 29. The water may be forced or drawn through the apparatus by suitable means as pumping or gravity flow.

Within the discharge chambers 5, 6, 7, 8 are placed assemblages of electrodes, the position of which is indicated in Figures 1 and 2. An assemblage is formed (see Figure 4) by a pair of flat sheets of wire gauze (preferably of iron with a coating of vitrified enamel) whereof two sheets 32, 33 with intervening dielectric sheet 34 (preferably of India mica) are closely spaced. In Figure 1 only one such pair 32, 33 with intervening dielectric sheet 34 are shown placed in each of the discharge chambers of the generator, a similar sheet 35 being placed on the outside faces of any single assemblage. The sheets 32, 33 of metal gauze are circular and all of the same dimensions, while the dielectric sheets 34, 35 are also circular and all of equal dimensions but of so much larger than the sheets of gauze as to leave a margin extending beyond each edge of the latter, as shown in Figure 3. From this figure it will be seen that the distance pieces 36, 37 partly serve to form respectively the gas inlet slots 21 and outlet slots 24, and are interposed between the edges of adjacent sheets of insulating material, each such distance piece 36, 37 being constituted by a small segmental plate of mica or other suitable insulating material of a thickness corresponding to the thickness of the sheet or sheets of gauze and lying between the correspondingly adjacent dielectric sheets.

Electric alternating current is supplied to the respective gauze sheets 32, 33 of opposite polarities from the terminals 38, 39 housed within porcelain or other insulators 40, 41 of usual construction mounted on the cover disc 14 through openings therein to the interior of the container by way of the vertically drilled passages 42, 43, the terminals 38, 39 being connected below by means of branching wires 44, 45 attached to the opposite lateral edges of gauge sheets 32, 33 which serve respectively as electrodes of opposite polarities in the several pairs, all the branching wires 44, 45 of one polarity being suitably insulated and connected to one terminal.

It will be perceived that no part of the stream of gas in its passage from the inlet slots 21 to the outlet slots 24 can avoid passing through the minute interstices of, or between, the sheets of gauze, so that the apparatus affords a very efficient means of obtaining the maximum production of hydrogen peroxide relative to the power consumed and to the quantity of gas passed through the apparatus. The obliquely placed slots 21, it will be additionally perceived, produce a vortical motion of the gases toward the center outlet slots 24, thus inducing the gases to move at a relatively higher velocity on approaching the center than is initially attained near the outer circumference of the gauze electrodes 32, 33, with the result that a uniform distribution of temperature is obtained over the electrode surfaces and adjacent dielectric sheets, so that the apparatus also provides an efficient means of reducing molecular dissociation of the hydrogen peroxide when formed in the discharge zone.

Figure 5 shows in plan view a range of four generators each constructed substantially as described with reference to Figures 1 to 4. In this case the gas inlet pipes of all generators communicate by way of pipe connections 46 with a single gas supply pipe 47, and similarly the gas outlet pipe of all the generators communicate by way of pipe connections 48 with a single hydrogen peroxide delivery pipe 49, the connections being arranged in parallel in such a manner as to insure the passage of equal quantities of gas through the several units. The electric circuit also passes through all units in parallel, current being supplied to the terminals from cables 50, 51 as indicated.

It will be observed that the improved apparatus in the present invention is adapted to enable a high efficiency to be obtained with a comparatively low voltage. This is shown by the fact that whereas, with apparatus hitherto in use, the voltage usually required for working of apparatus ranges from about 10,000 in the most favorable cases, up to as much as 20,000, the apparatus in the present invention has been found to give best results when working at a voltage of 3000 to 4000. Moreover, whereas the electric discharge tubes hitherto employed for the production of hydrogen peroxide require an alternating current having a frequency of not greater than about 60 and in some cases as low as 25 cycles per second, the apparatus herein described has been found capable of yielding a pure, highly concentrated product when working with a frequency of as high as 3000.

Having explained in general the process and given an example of the practice, the invention may be further described in detail by the following example which may illustrate the practice of the process as carried out in the above described particular device which is declared suitable for the purpose as set forth:

Referring again to Figure 5, a mixture of hydrogen and oxygen which ranged in composition between one to six per cent oxygen and between ninety-nine and ninety-four per cent hydrogen was introduced into the gas supply line 47, thence by way of pipe connections 46 and inlet gas pipes 19 (see Figures 1 and 2) simultaneously into each generator constituting one unit of a series which was connected in parallel with electric current by means of power supply cables 50, 51. The gases were made to enter, by suitable means already disclosed, the cylindrical spaces 20, into the passage slots 21 which imparted a vortical motion to the gases directed radially toward the center in the discharge zones, the rate of flow of the gas mixture radially across the faces of the electrode assemblages 32, 33, 34 being so regulated by an externally placed valve (not shown) in the supply pipe line 47, as to cause a flow of 40 lateral centimeters per second. An alternating current of 500 cycles frequency was caused to produce a potential difference of 3000 to 4000 volts across the current supply cables 50, 51 and was made to supply power to the gauze electrode sheets 32, 33 by means of the terminals 38, 39, and connecting wires 44, 45 producing a discharge in the zones between and bounded by gauze sheets 32, 33 and the interposed dielectric sheets 34, while the gases were made to pass thereover and through the discharge zones in contact with the electrodes. Hydrogen peroxide, water vapor, and ozone were formed and were continuously swept from the activating spaces through the outlet slots, the outlet passages 22, and into the delivery pipe 49 by way of outlet pipes 23 and outlet connections 48, the outgoing gases consisting of hydrogen in high concentration together with hydrogen peroxide, water vapor, oxygen and ozone which were present in low concentration and were in a highly diluted state. The temperature of the gases during passage through the discharge was regulated such that it remained below 70° C. by means of the water circulation system which was provided. The cooling water, initially at 15° to 25° C., was introduced by means already disclosed, into the water supply line 52, the generator water inlet pipes 25, the passages 26, the slots 27, and into the water pockets 9, where the water came in contact with the walls of the separator plates 10, 11 producing a cooling effect upon the walls of the discharge chambers, from whence the water after being raised to a temperature of about 50° C., was made to pass outward through slots 30, passages 31, collecting chamber 29, and generator outlet pipes 28, into the water discharge line 53, while the rate of flow of water through the apparatus was regulated to keep the temperature of the discharging stream at about 50° C. The gases were made to circulate continuously through the apparatus in cycle at approximately atmospheric pressure while the ratio of oxygen to hydrogen in the gas mixture was maintained between one to six per cent oxygen and ninety-nine to ninety-six per cent hydrogen, fresh oxygen and fresh hydrogen being added separately from time to time to take the place of the two per cent by volume of the gases which was extracted from the mixture on each cycle through the apparatus. The condensable hydrogen peroxide vapor, and water vapor issuing from delivery pipe line 47 with the stream of other gases, contained sixty to seventy per cent concentration by weight of hydrogen peroxide, while the energy consumption for the production of one kilogram of the one hundred per cent product was 60 to 70 kwh.

I have thus described a process embodying my invention specifically and in detail, in order that the manner of practicing the same in the production of hydrogen peroxide may be fully understood. I declare that what I claim as new and desire to secure by Letters Patent is:

1. The process for the synthesis of hydrogen peroxide by introducing hydrogen and oxygen at high velocity into a silent electric discharge using high frequency power of 500 to 3000 cycles per second.

2. The process for the synthesis of hydrogen peroxide in the silent electric discharge from hydrogen and oxygen wherein the gas mixture consists of substantially between 92% to 100% hydrogen and 8%–0% oxygen is activated at electrical frequencies of 500 to 3000 cycles per second in said silent electric discharge.

3. The process for the manufacture of hydrogen peroxide directly from a mixture of hydrogen and oxygen by means of the high frequency silent electric discharge, the frequencies specified being 500 to 3000 cycles per second, the said mixture of gases being maintained between the temperature limits of 15° C. to 70° C. while and during their passage through the discharge, the regulation of the temperature of the gases being accomplished by means of suitably cooled electrodes in contact with which the gases pass.

4. The process for the manufacture of hydrogen peroxide from the materials, hydrogen and oxygen, by means of passage of these gases flowing at a lineal rate of about 40 cm. per second, through the high frequency silent electric discharge, the frequency of the discharge being specified as 500 to 3000 cycles per second.

5. The process for the manufacture of hydrogen peroxide directly from a mixture of hydrogen and oxygen by means of the silent electrical discharge, the said gases being kept between the temperature limits of 15° C. and 70° C. and passed through the discharge, the gases being pre-cooled before entering the discharge and moved through the same at a high velocity, the frequency of the current being between 500 and 3000 cycles per second.

6. The process for the manufacture of hydrogen peroxide which consists of passing a mixture of hydrogen and oxygen, which is substantially of the composition 6 volume per cent. of oxygen with 94 volume per cent. of hydrogen, into a silent electric discharge, which consists of causing the gas mixture to flow with an initial linear velocity of about 40 centimeters per second through the discharge zone and across the faces of the electrodes located in the discharge zone, whereby the velocity of said gas mixture is caused to be progressively increased, after introduction into the reaction zone, simultaneously with the increasing temperature and increasing peroxide content of the gas mixture during its passage across said zone.

7. The process for the manufacture of hydrogen peroxide which consists of passing a mixture of hydrogen and oxygen, which is substantially of the composition 6 volume per cent. of oxygen with 94 volume per cent. of hydrogen into a silent electric discharge which is produced between electrodes supplied with alternating current of 500 to 3000 cycles frequency and which are maintained at a potential difference of 3000 to 4000 volts.

8. The process for the direct manufacture of hydrogen peroxide from the elements hydrogen and oxygen which consists of passing a mixture composed substantially of 4 to 8 volume per cent. of oxygen with 96 to 92 volume per cent. of hydrogen into a silent electric discharge which is produced between electrodes supplied with alternating current of 500 to 3000 cycles frequency and which are maintained at a potential difference of 3000 to 4000 volts; whereof, said electrodes of opposite polarity extend in close superficial proximity to one another, a dielectric sheet being interposed between adjacent electrodes, while the electrodes and dielectric sheets of circular construction are housed within a closed space adapted to cause the gas mixture to be fed in radially and from all sides of the outer edges of the electrodes, whereby the gas mixture in its passage through the discharge zone is confined to the interstices of and between adjacent electrodes and between each electrode and adjacent dielectric sheet as and for the purpose set forth.

9. The process for the manufacture of hydrogen peroxide in a silent electric discharge embodying the combination of: introduction of a gas mixture containing 4 to 8 volume per cent. of oxygen with 96 to 92 volume per cent. of hydrogen into a silent electric discharge while the pressure of the gas mixture is maintained at approximately atmospheric pressure and the initial temperature of the mixture is approximately atmospheric temperatures; forcing said gaseous mixture into the reaction zone of said electric discharge and in its passage therethrough restricting its rising temperature to or at about 50 degrees but not above 70 degrees centigrade; flowing said mixture with an initial lineal velocity of about 40 centimeters per second through the discharge zone and across the faces of the electrodes located therein, but progressively increasing the gas velocity after admission into the reaction zone simultaneously with the temperature and hydrogen peroxide content of the gas mixture; passage of said gaseous mixture through said silent electric discharge which is produced between electrodes supplied with alternating current maintained at a potential difference of 3000 to 4000 volts, wherein the electrodes and dielectrics of circular construction are housed within a closed annular space adapted to cause the gas mixture to be fed in radially and from all sides of the outer edges of the electrodes, whereof the gas mixture in its passage through the reaction zone is confined to the interstices of or between adjacent electrodes of opposite polarity and between adjacent dielectric sheets.

10. The process for the synthesis of hydrogen peroxide from hydrogen and oxygen in the silent electric discharge wherein thin mica sheets are utilized as dielectric material, said mica material being employed for prevention of the immediate catalytic decomposition of hydrogen peroxide vapor at the time of its formation in the reaction zone of said discharge.

11. The process for the synthesis of hydrogen peroxide by introducing hydrogen and oxygen into a silent electric discharge using high frequency power of 500–3000 cycles per second.

12. The process for the manufacture of hydrogen peroxide which consists of passing a mixture of hydrogen and oxygen into a silent electric discharge which is produced between electrodes supplied with alternating current of 500–3,000 cycles frequency and which are maintained at a potential difference of 3,000–4,000 volts.

LYNN H. DAWSEY.